March 15, 1938. C. D. STROMGREN 2,111,080
REEL SEATING MEANS FOR FISHING POLES
Filed March 23, 1937
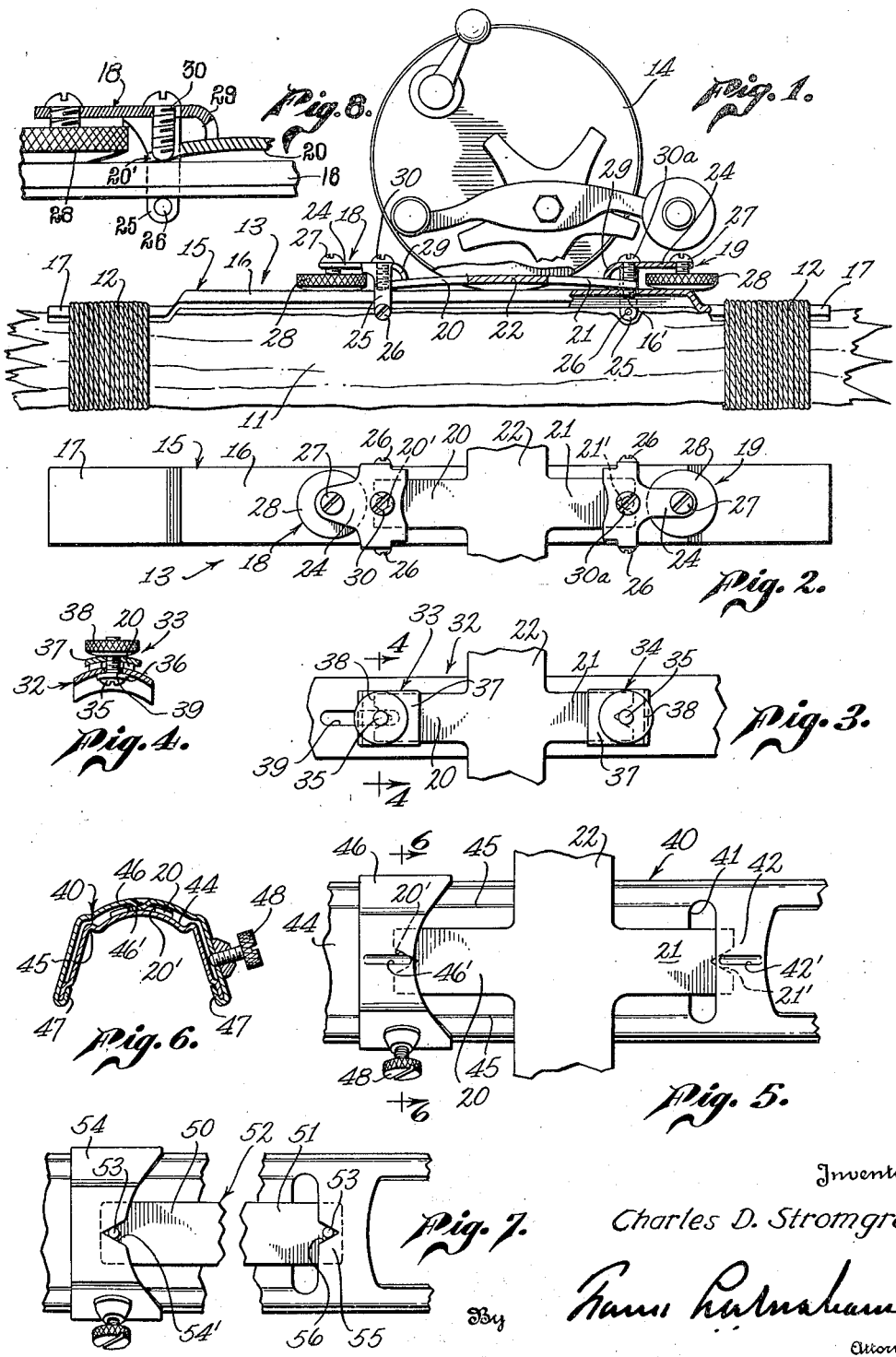
Inventor
Charles D. Stromgren Patented Mar. 15, 1938

2,111,080

UNITED STATES PATENT OFFICE 2,111,080

REEL SEATING MEANS FOR FISHING POLES

Charles D. Stromgren, Los Angeles, Calif.

Application March 23, 1937, Serial No. 132,522

9 Claims. (Cl. 43—22)

This invention relates generally to fishing tackle and more particularly to means for detachably mounting fishing reels on fishing rods, or poles.

The ordinary means for attaching reels to fishing rods comprises what is termed a reel seat which is permanently attached or mounted on the pole and which is adapted to accommodate the base portion of the fishing reel. These seats are ordinarily formed with a channel-way or seat portion which is bounded at each side by a rib running longitudinally of the channel-way. At one end of this channel-way is a slot beyond which is formed an arcuate bridge under which one arm of the base of the ordinary fishing reel is adapted to fit. A slip ring or adjustable bridge is slidably mounted on the reel seat and adapted to be forced over the other end of the reel base in order to clamp the reel to the base.

Reel seats and fishing reels are made in various sizes, and it is common to mount different sized reels on fishing poles for different types of fishing. Consequently, great difficulty is encountered in properly securing various sized reels to a fishing pole which has a reel seat attached thereto which is designed primarily to accommodate a particular sized reel. Thus, if the reel seat channel-way and the base of the reel do not co-fit the seat fails to properly hold the fishing reel rigid upon the pole. Consequently in "playing" a fish, the reel slips about on the seat to the inconvenience of the fisherman.

In view of the inadequacy of the present type of reel seat to firmly hold various sizes of fishing reels, it is a primary object of this invention to provide improved means for attaching various sized fishing reels to a fishing rod or pole so that such reels will be securely and rigidly mounted.

It is a further object of this invention to provide a reel seat which is particularly adapted to cooperate with various sized reels having bases with notches, or slots, cut in the ends thereof in order to rigidly hold the reel. It is also an object of this invention to provide a reel seat which is particularly adapted to cooperate with a fishing reel having a base formed with projections thereon in order to rigidly hold the reel.

Other objects and advantages of this invention are apparent in the drawing, which is for illustrative purpose only, and in which:

Fig. 1 is a fragmentary side elevation of a fishing pole showing a preferred form of reel seat attached thereto and showing a reel mounted in the reel seat. Part of the reel seat is shown in section and part of the reel is broken away to facilitate illustration.

Fig. 2 is a top plan view of Fig. 1 with the reel removed except for a portion of the base thereof;

Fig. 3 is a fragmentary plan view of a modified form of reel seat showing the base portion of the reel mounted therein;

Fig. 4 is a cross section on line 4—4 of Fig. 3.

Fig. 5 is a fragmentary plan view of another modified form of reel seat and showing the reel base mounted thereon.

Fig. 6 is a cross section on line 6—6 of Fig. 5; and

Fig. 7 is a fragmentary plan view of a third modified form of the invention.

Fig. 8 is a fragmentary sectional elevation on line 8—8 of Fig. 2.

Referring to Fig. 1, reference numeral 11 indicates a fishing pole on which is mounted, by means of the cord wrappings 12, a preferred form of reel seat, generally indicated by reference numeral 13, upon which is mounted a fishing reel 14.

The reel seat comprises a seat member 15 having a central portion 16 having extended end portions 17 about which the cord wrappings 12 are wound to hold the seat to the pole. Mounted on the central portion 16 of the reel seat are the clamps 18 and 19 under which the extensions, or arms 20 and 21 of the reel base 22 are adapted to fit. These clamps comprise a central clamping body, or plate, 24, which has formed thereon depending leg portions 25 at the lower end of which are horizontally disposed fulcrum screws 26 which extend a short distance under the central portion 16 of the reel seat and thereby retain the clamps in a slidably mounted relation to the seat except as hereinafter described. At the outer end of the clamps are screws 27 on which are mounted the knurled clamping nuts 28 which serve to force the toes 29 of the clamp downwardly against the arms on the base of the reel. The screws 26 thus provide a fulcrum against which the clamping nuts operate to force the toes of the clamps downwardly.

One of the objects of this invention is to prevent the reel from moving laterally on the reel seat and for accomplishing this purpose abutment screws 30 and 30a are provided which extend downwardly through the respective clamps in a plane with the leg portions 25 of the clamps and spaced halfway therebetween. The abutment screw 30 in the clamp 18 extends downwardly a sufficient distance to engage the notch 20' of the arm 20 but not far enough to engage the top of the central portion 16 of the seat member. Clamping member 18 is therefore slidably adjustable along the seat member. On the other hand, abutment screw 30a on clamp 19 is made longer than the screw 30 and extends into a hole 16' in the seat member thus anchoring the clamp 19 upon the seat member.

To prevent the reel from transverse or lateral movement on the reel seat the reel base arms are respectively provided at their ends with notches 20' and 21' which are adapted to accommodate the abutment screws 30 and 30a respectively.

In the operation of the device the reel is placed upon the seat member and the forward arm 21 of the reel base slipped under the clamp 19 and against the abutment screw 30a so that the abutment screw is within the confines of notch 21'. The clamping nut on clamp 19 is then tightened forcing the toe of the clamp downwardly upon the upper portion of the arm 21. The clamp 18 which, up to this time, may be assumed to have been at some position on the seat member to the left of the position it occupies in Fig. 1, is moved toward the reel until the abutment screw 30 fits in the notch 20' of arm 20. The clamping nut 28 is then tightened against the upper surface of the seat member and thus forces the toes 29 of the clamp against the upper surface of the arm 20.

From this description it can be seen that whether the reel base arms are of small or large dimensions the reel will in any case be positively held in the position in which it is clamped and cannot be displaced laterally or longitudinally.

It is not essential to this invention that the fulcrum screws 26 be provided, as it is within the scope of this invention to form the lower end of the legs 25 of the clamp in some other manner. It is also within the scope of the invention to provide the reel base arms with any particular type of notch or slotted end and it is not intended to limit this invention to the V-notch shown.

In Fig. 3 is shown a modified form of the invention in which the seat member 32 is provided at one end with a slidably mounted clamp 33 and at the other end with a stationary clamp 34. These clamps each comprise a screw 35 which has a washer 36 adjacent its head and on the under surface of the seat member. On the upper surface of the seat member is a clamp member 37 which is adapted to be forced downwardly into a clamping position by the clamping nut 38.

The clamp 34 is rigidly mounted on the reel seat and, in the case of this clamp, the screw 35 extends through a hole in the reel seat. On the other hand the clamp 33 is slidably mounted on the reel seat which is provided with a slot 39 through which the screw 35 of the clamp 33 extends. With this construction a reel may be attached to the reel seat in the same manner in which it is attached to the preferred form of the invention. However, in this form of the invention the screw 35 serves in the dual capacity of being both a means for holding the clamp together and also an abutment member which cooperates with the notches in the reel base arms.

In Figs. 5 and 6 is shown another modification of the invention in which a seat member 40 is provided which has a transverse slot 41 beyond which is located a bridge 42 which has a downwardly extending projection or rib 42' pressed in its center. This seat member 40 resembles an ordinary type of reel seat in that it has a central seat portion, or channel-way 44 which is bounded by the ribs 45. The bridge 42 differs from the ordinary bridge in having the pressed downwardly extending projection above referred to. At the opposite end of the reel seat is slidably mounted a saddle 46. This saddle has its lower ends bent back upon themselves as shown at 47 to fit over the lower edges of the reel seat 40. The saddle is provided with set screw 48 to hold the saddle in adjusted position upon the reel seat. The saddle is also provided with a central downwardly extending projection or rib 46' which is pressed therefrom. When the reel is placed in position upon the seat the projections on the bridge and the saddle are adapted to fit into the respective notches in the base of the reel thereby holding it in position in a manner similar to the way the reel is held in the preferred form of the invention. In this form of the invention the arm 21 of the reel base 22 is slid under the bridge 42 so that the projection 42' on the bridge extends into the notch 21'. The retaining plate 46 is then moved into the position in which it is shown in Fig. 5, its projection 46' fitting into the notch 20' in arm 20. The adjustment screw 48 is then tightened to hold the plate in position and the reel is then firmly mounted upon the seat.

In the form of the invention illustrated in Figs. 5 and 6 it is contemplated that any type of projection might be utilized in place of the pressed inverted ribs or projections 42' and 46'.

In Fig. 7 another modification of the invention is shown in which the arms 50 and 51 of a reel base 52 are provided with pins 53 at each end which extend above the upper surface of the arms. In the retaining plate 54 is a notch or slot 54' which is adapted to receive the pin 53 of arm 50. The bridge 55 is provided with a notch 56 adapted to accommodate the pin 53 of arm 51 at the opposite end of the reel base 52. This construction likewise firmly holds the reel upon the reel seat.

I claim as my invention:

1. In combination, a fishing reel having extended arms thereon forming a base; a reel seat member adapted to be attached to a fishing pole; clamps on said seat member engaging the arms on said reel; and interengaging cooperating notch and projection means on said arms and said clamps for preventing movement of said reel relative to said seat member.

2. In combination, a fishing reel having arms thereon forming a base, said arms being notched at their ends; a reel seat member adapted to be attached to a fishing pole; clamps on said seat member engaging said arms; and abutment members on said clamps for engaging the notched ends of said arms.

3. In combination, a fishing reel having arms thereon forming a base, said arms being notched at their ends; a reel seat member; a clamp fixedly mounted on said seat member; a clamp slidably mounted on said seat member; an abutment member on each of said clamps; said reel being mounted on said seat member so that the notched ends of said arms engage the respective abutment members of said clamps.

4. A reel seat for fishing poles and the like, comprising: a seat member adapted to be attached to a fishing pole; a clamp slidably mounted on said seat member; a clamp fixedly mounted on said seat member; each of said clamps including a plate portion spaced above the seat member and having clamping toes at one end and screw means at the other end and having depending leg portions adapted to act as fulcrum means for tightening said clamps.

5. In combination, a fishing reel having extended arms forming a base, a seat member adapted to be attached to a fishing pole; clamps on said seat member engaging said arms, each of said clamps including a plate portion spaced above the seat member and having clamping toes at one end and screw means at the other end and having depending leg portions adapted to act as fulcrum means for tightening said clamps; and interengaging means on said reel and said seat member for preventing movement of said reel relative to said seat member.

6. A reel seat for fishing poles and the like, comprising: a seat member having a longitudinal slot; a clamp slidably mounted in the slotted portion of said seat member; and a clamp fixedly mounted on said seat member; said clamps comprising a bolt extending through said seat member and having a clamping plate and thumb nut mounted thereon above said seat member.

7. In combination, a fishing reel having arms thereon forming a base, said arms being notched at their ends; a seat member having a longitudinal slot; a clamp slidably mounted on the slotted portion of said seat member; a clamp fixedly mounted on said seat member; said clamps each comprising a bolt extending through said seat member and having a clamping plate and a thumb nut mounted thereon above said seat member; said bolts being adapted to act as abutment members for the notched ends of said arms.

8. A reel seat for fishing poles and the like comprising: a seat member having a transverse bridge and a slot adjacent said bridge, said bridge having a projection formed thereon; and a saddle slidably mounted on said seat member, said saddle having a projection formed thereon.

9. In combination, a fishing reel having arms forming a base, said arms being notched at their ends; a seat member having a transverse bridge and a slot adjacent said bridge, said bridge having a projection formed thereon; and a saddle slidably mounted on said seat member having a projection formed thereon; the projections on said bridge and said saddle being adapted to engage the notched ends of said arms.

CHARLES D. STROMGREN.